US006920019B2

United States Patent
Martin et al.

(10) Patent No.: US 6,920,019 B2
(45) Date of Patent: Jul. 19, 2005

(54) DEVICE AND METHOD FOR IMPROVED STICTION RELIABILITY IN DISK DRIVES EMPLOYING PADDED SLIDERS

(75) Inventors: Richard E. Martin, Worcester, MA (US); Brian D. Strom, Cupertino, CA (US)

(73) Assignee: Maxtor Corporation, Longmont, CO (US)

( * ) Notice: Subject to any disclaimer, the term of this patent is extended or adjusted under 35 U.S.C. 154(b) by 705 days.

(21) Appl. No.: 09/768,976

(22) Filed: Jan. 23, 2001

(65) Prior Publication Data

US 2002/0097526 A1 Jul. 25, 2002

(51) Int. Cl.[7] ................................................. G11B 5/48
(52) U.S. Cl. ................ 360/245; 360/235.4; 360/235.7; 360/235.8; 360/235.9
(58) Field of Search .......................... 360/246.2, 235.4, 360/236.6, 235.7, 235.8, 235.9, 245; 369/245

(56) References Cited

U.S. PATENT DOCUMENTS

| | | | | |
|---|---|---|---|---|
| 5,388,017 A | | 2/1995 | Franco et al. | |
| 5,612,839 A | * | 3/1997 | Jacques | 360/246.2 |
| 5,739,982 A | * | 4/1998 | Arya et al. | 360/234.5 |
| 5,760,986 A | | 6/1998 | Morehouse et al. | |
| 5,768,055 A | | 6/1998 | Tian et al. | |
| 5,835,303 A | | 11/1998 | Morehouse et al. | |
| 5,841,608 A | | 11/1998 | Kasamatsu et al. | |
| 5,841,610 A | * | 11/1998 | Battu et al. | 360/254.7 |

* cited by examiner

Primary Examiner—A. J. Heinz
Assistant Examiner—Mark Blouin
(74) Attorney, Agent, or Firm—David M. Sigmond

(57) ABSTRACT

A disk drive (10) including one or more storage disks (12) and a head stack assembly (14) is provided herein. The head stack assembly (14) includes an actuator assembly (16) and a plurality of transducer assemblies (18). The actuator assembly (16) moves the transducer assemblies (18) relative to the storage disks (12). Each transducer assembly (18) includes a slider (22), a load beam (24) and a head suspension (26) that secures the slider (22) the load beam (24). Preferably, the slider (22) includes an air bearing surface (27) and one or more pads (28). Importantly, the head suspension (26) maintains the slider (22) at a negative pitch static attitude. As a result thereof, the slider (22) is less likely to tip during shutdown and/or after vibration.

40 Claims, 3 Drawing Sheets

DEVICE AND METHOD FOR IMPROVED STICTION RELIABILITY IN DISK DRIVES EMPLOYING PADDED SLIDERS

FIELD OF THE INVENTION

The present invention relates generally to disk drives. More specifically, the present invention relates a disk drive having a padded slider that is less prone to tip.

BACKGROUND

Disk drives are widely used in computers and data processing systems for storing information in digital form. In conventional Winchester type disk drives, a slider "flies" upon an air bearing or cushion in very close proximity to a storage surface of a rotating data storage disk. A data transducer is secured to the slider. The storage surface carries a thin film of magnetic material having a multiplicity of magnetic storage domains that may be recorded and read back by the data transducer. Preferably, the storage surface is smooth so that the slider can fly relatively close to the storage surface to maximize data transfer accuracy.

For a multiple disk, disk drive, a plurality of sliders are supported near the storage surfaces of the storage disks with a plurality of actuator arms. More specifically, each slider is secured to one actuator arm with a load beam and a head suspension having a suspension gimbal. Typically, an actuator motor moves the actuator arms along a predetermined path to position the sliders relative to the storage surfaces of the storage disks. The combination of the sliders, the load beams, the head suspensions, the actuator arms, and the actuator motor are commonly referred to as a head stack assembly.

FIG. 1A illustrates a prior art head suspension 10P, slider 12P and a storage disk 14P. In this embodiment, the slider 12P has a positive pitch static angle 16P. The pitch static angle 16P defines the free angle formed between the slider 12P and the horizontal when the suspension 10P is held so that the slider 12P is positioned at the normal flying height above the storage disk 14P.

The air bearing which enables each slider to fly in close proximity to the surface of the disks, is created by air flow generated by rotation of the disks. When the disk rotation ceases, the air bearing dissipates and the sliders are no longer supported above the surfaces of the disks. Thus, when power is removed from a spindle motor that rotates the storage disks, the sliders come to "rest" or "land" on the surfaces of the disks. Likewise, when the spindle motor is powered up, the sliders "take off" from the surfaces of the disks. When the slider is at rest on the surface of a disk, a static frictional force ("stiction") arises between the slider and the disk. The stiction can lead to loss of data and/or failure of the disk drive due to erosion or scarring of the magnetic film on the surfaces of the disks. Alternately, the stiction may prevent the spindle motor from spinning the disks and/or may cause the data transducer to fail.

In some disk drives, the actuator motor positions each slider over a landing zone as power is removed from the spindle motor. This inhibits the slider from resting on an area of useful data storage during non-rotation of the storage disk. Further, the landing zone is typically textured to minimize striction between the slider and the storage disk at the landing zone.

Alternately, in a ramp-type disk drive, the actuator motor moves the sliders radially outward so that each head suspension slides onto a ramp positioned near an outer diameter of the storage disks. In this position, each slider is "unloaded" from the storage disks.

Still alternately, some disk drives are designed with padded sliders that rest on the smooth storage surface when disk rotation ceases. Referring to FIG. 1A, a typical padded slider 12P includes an air bearing surface 18P with one or more pads 20P which are positioned closer to the storage disk than the air bearing surface 18P. The pads 20P of a "padded" slider 12P help to minimize the contact between the slider 12P and the disk 14P. This, in turn, helps to minimize striction and the potential for damage that may occur to the disk drive or any of its elements during the shut down or start up phases of operation.

Unfortunately, padded sliders 12P can be prone to rotate and/or tip off their pads 20P when the slider 12P comes to rest on the storage disk 14P. The predominant driving force for tipping is friction that acts during backward disk 14P rotation, which can occur if the motor cogs, or under the influence of external rotational shock. This friction acts at the slider 12P/disk 14P interface and provides a moment that acts to tip the slider 12P off its pads 20P. Referring to FIG. 1B, the tipping brings the non-padded portion of the air bearing surface 18P near the back of the slider 12P in contact with the disk 14P. Unfortunately, the contact area between slider 12P and the disk 14P and stiction increase dramatically with the slider 12P in the tipped condition.

On attempt to solve the problem of slider tipping is to locate the trailing pads close to the trailing edge of the slider and moving the load point toward the slider leading edge. This reduces the friction between the slider and the disk. Unfortunately, the distance between the trailing edge and the trailing pads is also constrained by flying height clearance of the slider. More specifically, the extent to which the trailing pads can be moved to the trailing edge is limited by the requirement that the trailing edge pads clear the disk when the drive is operating at full speed. Generally, the farther back the pads are placed, the less likely they are to clear the disk under all full speed circumstances. Therefore, this method is not completely satisfactory.

In light of the above, it is an object of the present invention to provide a reliable, simple, and efficient device which effectively protects the disks and the sliders during shut down and start-up of a disk drive. Still another object of the present invention is to increase the reliability of any disk drive that employs padded slider technology. Yet another object of the present invention is to provide a disk drive which is relatively easy and cost effective to manufacture, assemble and use.

SUMMARY

The present invention is directed to a disk drive that satisfies these objectives. The disk drive includes a storage disk, an actuator arm that moves relative to the storage disk, a load beam secured to the actuator arm, a slider positioned near the storage disk, and a head suspension that secures the slider to the load beam.

As used herein, the term "pitch static attitude" defines the free angle formed between the slider and the horizontal when the suspension is held so that the slider is positioned at the normal flying height.

Importantly, the head suspension maintains the slider at a pitch static attitude of approximately less than zero degrees. More specifically, the head suspension maintains the pitch static attitude at between approximately zero degrees and negative two degrees. As provided herein, if the pitch static angle is negative, a moment acts on the head suspension when the slider rests on the storage disk. The moment inhibits the slider from rotating and tipping in the event the motor cogs or the disk drive is shocked. By maintaining the pitch static attitude at an angle between negative two and zero degrees, the likelihood of contact between the non-padded portion of the slider and the disk during the start up and shut down phases is minimized. This minimizes the likelihood of drive stiction failure and extends the life of the disk drive. This may also allow for the use of polished media in disk drives.

The present invention also includes a method for enhancing the reliability of a disk drive. The method includes the steps of providing a storage disk, providing an actuator arm that moves relative to the storage disk, providing a slider positioned near the storage disk, securing a load beam to the actuator arm and securing the slider to the load beam with the head suspension. As provided above, the head suspension is used to maintain the slider at a pitch static attitude of between approximately negative two and zero degrees.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
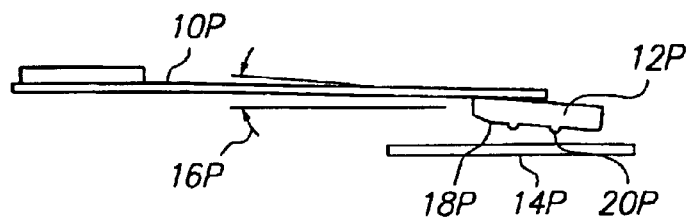
FIG. 1A is a simplified side plan illustration of a portion of a prior art, head suspension, a slider and a storage disk.
Figure 1B:
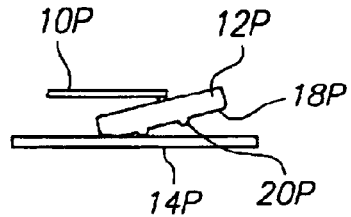
FIG. 1B is a simplified side plan illustration of a portion of a prior art, head suspension, slider and storage disk, with the slider tipped.

Referring initially to FIGS. 2–5, a disk drive 10 according to the present invention includes (i) a drive housing 11, (ii) one or more storage disks 12, and (iii) a head stack assembly 14 having an actuator assembly 16 and one or more transducer assemblies 18. Each transducer assembly 18 includes a data transducer 20, a slider 22, a load beam 24, and a head suspension 26. Preferably, each slider 22 includes one or more pads 28 which is positioned closer to the storage disk 12 than an air bearing surface 27. The pads 28 reduce stiction between the slider 22 and the storage disk 12 when the slider 22 contacts the storage disk 12.

As provided in detail below, the head suspension 26 maintains the slider 22 at a pitch static attitude 29 that inhibits the slider 22 from rotating and/or tipping off of the pads 28 when the slider 22 contacts the storage disk 12. As a result thereof, the likelihood of contact between the air bearing surface 27 and the storage disk 12 is reduced and striction is reduced.

A detailed description of the various components of a disk drive 10 is provided in U.S. Pat. Nos. 5,835,303 and 5,760,986, issued to Morehouse et al. The contents of U.S. Pat. Nos. 5,835,303, and 5,760,986, are incorporated herein by reference. Accordingly, only the structural aspects of the disk drive 10 which are particularly significant to the present invention are discussed and illustrated herein.

The drive housing 11 retains the various components of the disk drive 10. The drive housing 11, illustrated in FIG. 2, includes a base 30 and four (4) side walls 32. A typical drive housing 11 also includes a cover (not shown for clarity), which is spaced apart from the base 30 by the side walls 32.

The storage disks 12 store data in a form that can be subsequently retrieved if necessary. A magnetic storage disk 12 is commonly used to store data in digital form. For conservation of space, each storage disk 12 preferably includes a data storage surface 34 on each side of the storage disk 12. These storage surfaces 34 are typically divided into a plurality of narrow, annular regions (not shown) of different radii, commonly referred to as "tracks." Those skilled in the art will recognize that the present invention is capable of being used in the disk drive 10 having one or more storage disks 12. For example, the disk drive 10 can include four (4), six (6), nine (9), or twelve (12) spaced apart storage disks 12. The head suspension 26 and the slider 22 provided herein allows for the use of polished data storage surfaces 34 without texture.

The storage disk(s) 12 are rotated on a disk spindle 35 that is journalled to the drive housing 11 and rotates about a spindle axis relative to the drive housing 11. The disk spindle 35 is rotated at a predetermined angular velocity by a disk motor (not shown). The rotation rate of the storage disks 12 varies according to the design of the disk drive 10.

The actuator assembly 16 includes (i) the one or more actuator arms 36 for retaining the transducer assemblies 18 proximate each storage surface 34 of each storage disk 12 and (ii) an actuator motor 37 for moving the actuator arms 36. In the embodiment shown in the Figures, each actuator arm 36 is attached to and cantilevers from an actuator hub 38. In this embodiment, the actuator hub 38 is mounted to and rotates relative to an actuator shaft 40 on an actuator bearing assembly (not shown). This allows the actuator hub 38 to rotate about an actuator axis that is substantially parallel with the spindle axis. The combination of the actuator hub 38 and the actuator arms 36 is commonly referred to as an E-block.

The actuator motor 37 precisely moves the actuator hub 38, the actuator arms 36 and the transducer assemblies 18 relative to the storage disks 12. Basically, the actuator motor 37 moves each transducer assembly 18 between the plurality of annular tracks defined on the storage surfaces 34 of the disks 12 and the ramp 20.

The actuator motor 37 can be implemented in a number of alternate ways. For example, in the embodiment shown in the Figures, the actuator motor 37 is a rotary voice coil motor. In this embodiment, activation of the actuator motor 37 rotates the actuator hub 38 and moves the actuator arms 36 over the concentric data tracks on the disks 12.

Only a portion of the actuator motor 37 is illustrated in the Figures. Typically, the actuator motor 37 includes a flat, trapezoidal coil 42 that is attached to the actuator hub 38. The coil 42 is disposed between a pair of spaced apart permanent magnets (not shown) and a pair of spaced apart flux return plates (not shown) which are secured to the drive housing 11. The magnets have pole faces of opposite polarity directly facing opposite legs of the coil 42. The resultant magnetic fields are such that current passing through the coil 42 in one direction causes rotation of the actuator arms 36 in one radial direction relative to the disks 12 (such as the radially outward direction) while reverse current causes reverse direction movement (such as the radially inward direction). Thus, the actuator motor 37 is able to bi-directionally rotate the head stack assembly 14 relative to the drive housing 11 around the actuator axis.

Typically, the head stack assembly 14 is movable by the actuator motor 37 through a range of limited angular displacement. This limited movement allows the head stack assembly 14 to position the data transducer(s) 20 at the desired data track.

Figure 2:
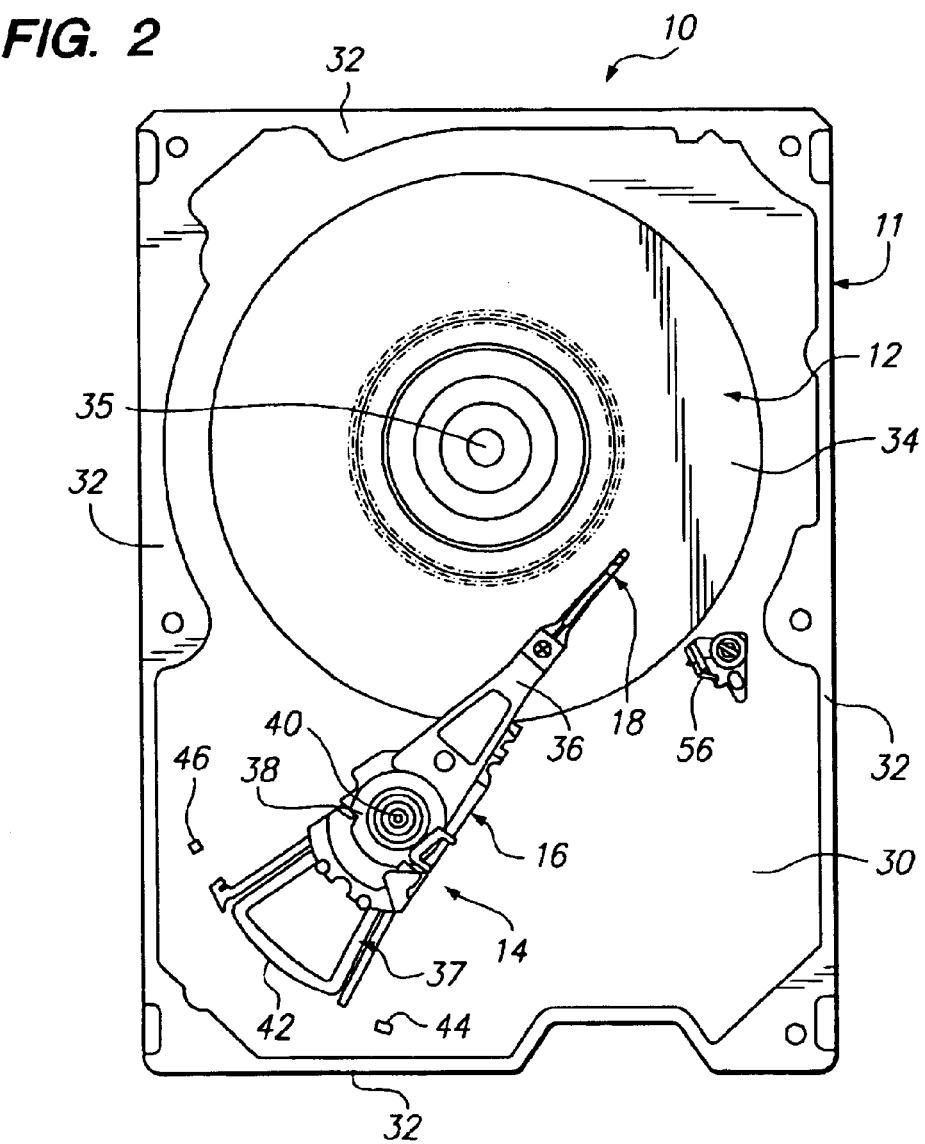
FIG. 2 is a simplified, top plan view of a disk drive having features of the present invention.

Preferably, the disk drive 10 includes an inner diameter stop 44 and an outer diameter stop 46, to limit the rotary travel of the head stack assembly 14. Referring to FIG. 2, the inner diameter stop 44 and the outer diameter stop 46 are secured to the drive housing 11. The inner diameter stop 44 prevents the head stack assembly 14 from crashing the transducer assemblies 18 into the disk spindle 35. The outer diameter stop 46 prevents the head stack assembly 14 from moving the transducer assemblies 18 radially outward too far.

Figure 3:
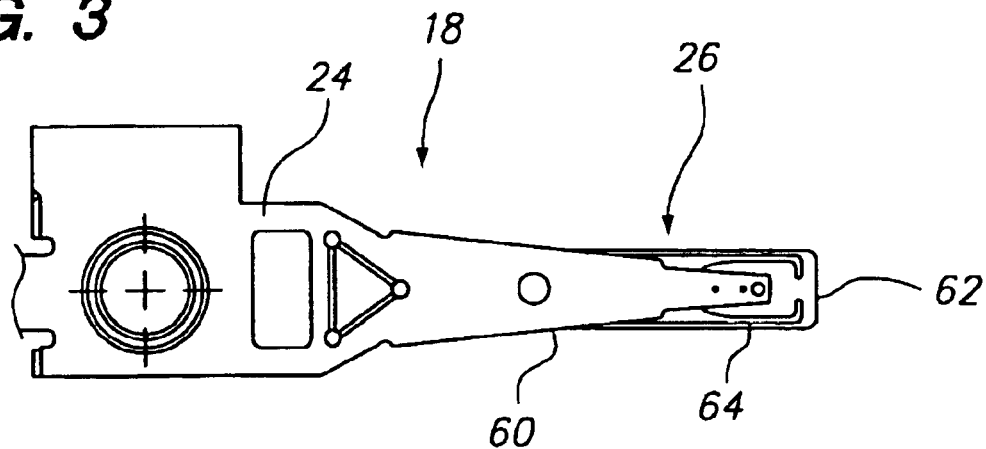
FIG. 3 is a top plan view of a transducer assembly having features of the present invention.

Referring to FIG. 3, each transducer assembly 18 includes a load beam 24 that secures one of the head suspensions 26 to one of the actuator arms 36 (not shown in FIG. 3). Each load beam 24 is flexible in a direction perpendicular to the storage disk 12 and acts as a spring for supporting the slider 22 and the data transducer 20. Each load beam 24 is resilient and biased to urge each slider 22 towards the storage surface 34.

Each data transducer 20 interacts with one storage surface 34 to access or transfer information to the storage disk 12. For a magnetic storage disk 12, each data transducer 20 is commonly referred to as a read/write head. To read or access data from a magnetic storage disk 12, the data transducer 20 produces electronic read signals in response to the passage of the tracks on the storage surface 34 of the disk 12. To write or transfer data to the disk 12, the data transducer 20 generates a magnetic field which is capable of polarizing the desired region of the storage surface 34. One or more data transducers 26 can be secured to each slider 22. The data transducer 20 is typically secured to a trailing edge 52 of each slider 22.

As illustrated in FIG. 2, the disk drive 10 can also include the ramp 56 for parking the sliders 22 during non-rotation of the storage disks 12. In the embodiment illustrated herein, the ramp 56 is positioned radially outward from the outer diameter of the storage disks 12. When the disks 12 are not rotating, the head suspensions 26 can rest on the ramp 56 to prevent data loss caused by contact between the slider 22 and the storage surface 34. Alternately, with the design provided herein, the disk drive 10 can be operated without the ramp 56.

As the disk 12 rotates, air flow between the slider 22 and the storage disk 12 causes the slider 22 to ride at an aerodynamically stabilized distance from the storage surface 34 of the storage disk 12.

The design of each slider 22 can be varied to suit the design requirements of the disk drive 10. As provided above, preferably each slider 22 is a padded slider that includes the air bearing surface 27 and at least one pad 28 which is positioned closer to the storage disk 12 than the air bearing surface 27 when the slider 22 is positioned near the storage disk 12. The pads 28 minimize the contact area between the slider 22 and the disk 12. The pads 28 are tall enough to prevent long-range adhesion forces and liquid meniscus forces which greatly increase the contact load between the slider 22 and the disk 12. Stated anther way, the pads 28 reduce stiction between the slider 22 and the storage disk 12 when the slider 22 contacts the storage disk 12.

Stated another way, the pads 28 maintain the air bearing surface 27 and the rest of the slider 22 spaced apart from the storage disk 12 when the slider 22 contacts the storage disk 12. A more complete discussion of suitable sliders 22 can be found in U.S. Pat. No. 5,768,055, issued to Tian et al.; U.S. Pat. No. 5,841,608, issued to Kasamatsu et al.; and U.S. Pat. No. 5,388,017 issued to Franco et al., the contents of which are incorporated herein by reference.

Figure 4:
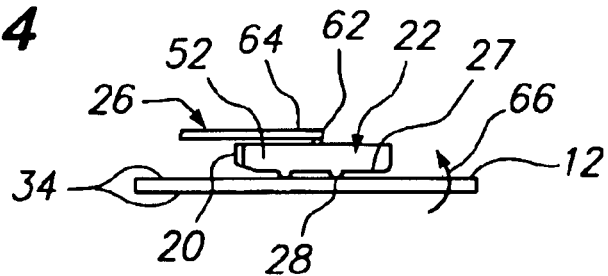
FIG. 4 is a simplified, side plan illustration of a portion of a head suspension, a slider, and a portion of a storage disk having features of the present invention.
Figure 5:
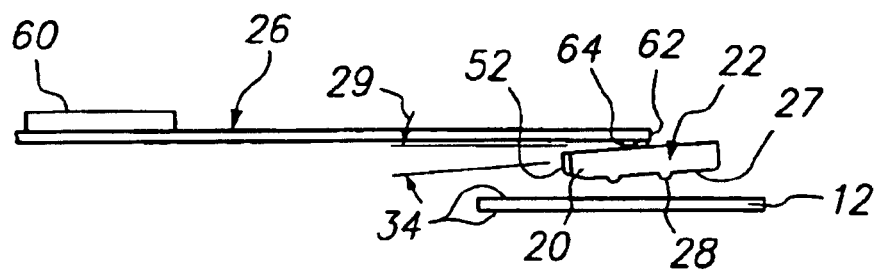
FIG. 5 is a simplified, side plan illustration of a portion of the head suspension, the slider and the storage disk.

The head suspension 26 connects the slider 22, including the data transducer 20, to the load beam 24. The design of the head suspension 26 can be varied to suit the design requirements of the head stack assembly 14. In the embodiment illustrated in the Figures, the head suspension 26 includes a proximal end 60, a distal end 62, a suspension gimbal 64 and a plurality of electrical traces (not shown). FIG. 3 is a top plan view of a load beam 24 and a head suspension 26. Alternately, FIGS. 4 and 5 are simplified illustrations of the head suspension 26 and the slider 22. The proximal end 60 is secured to the load beam 24. The distal end 62 cantilevers away from the load beam 24. The gimbal 64 is positioned between the distal end 62 and the proximal end 60. The gimbal 64 allows the slider 22 and the data transducer 20 to pivot relative to the storage disk 12.

Importantly, referring to FIG. 5, the head suspension 26 maintains the slider 22 at a pitch static attitude 29 of between approximately zero degrees and negative two degrees. If the pitch static angle 29 is negative, a moment 66 (illustrated in FIG. 4) acts on the head suspension 26 when the slider 22 rests on the storage disk 12. The moment 66 inhibits the slider 22 from rotating and tipping in the event the disk 12 rotates backwards. Stated another way, when the head stack assembly 14 is loaded onto the storage disk 12, the head suspension 26 is deformed. If the pitch static attitude 29 is negative, as illustrated in FIG. 5, the moment 66 acts to rotate the slider 22 counterclockwise to increase the stability of the slider 22. By maintaining the pitch static attitude 29 at between approximately negative two and zero degrees, the likelihood of contact between the non-padded portion of the slider 22 and the disk 12 during the start up and shut down phases is minimized. Thus, the present invention minimizes the likelihood of drive stiction failure. This extends the life of the disk drive 10 and allows for the use of polished media in disk drives.

Typically, the head suspension 26 is made of stainless steel and has a thickness of approximately 0.025 millimeters.

Figure 6:
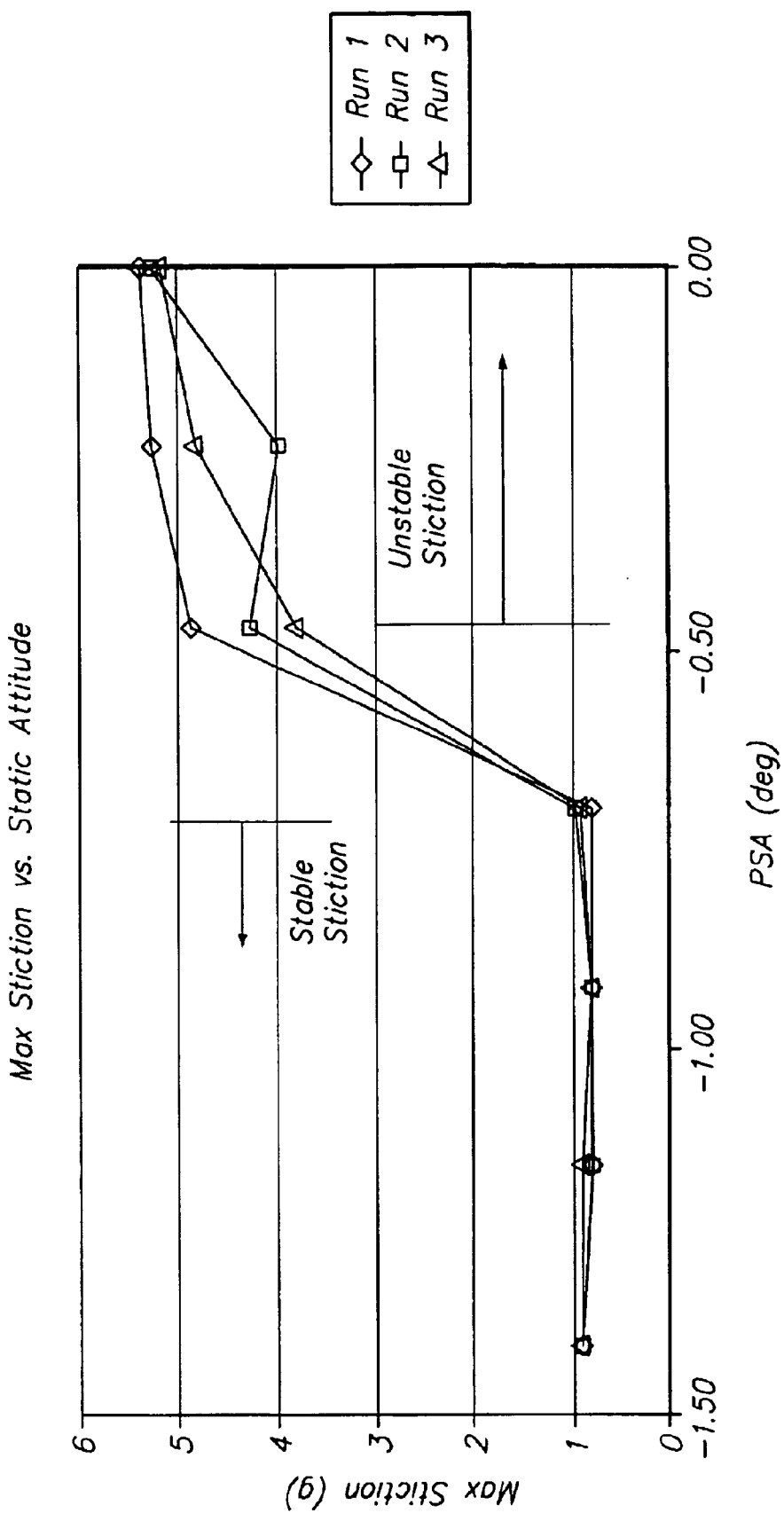
FIG. 6 is a graph that illustrates the relationship between stiction and pitch static attitude.

FIG. 6 is a graph that outlines the relationship between the stiction and pitch static attitude 29. FIG. 6 illustrates that a negative pitch static attitude 29 stabilizes a typically unstable slider 22. FIG. 6 also illustrates that stability increases as the pitch static attitude 29 decreases.

While the particular disk drive 10 and head suspension 26, as herein shown and disclosed in detail, is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A disk drive, comprising:
   a storage disk;
   an actuator arm that moves relative to the storage disk;
   a load beam secured to the actuator arm;
   a slider including a data transducer, a leading edge, a trailing edge, an air bearing surface and first and second pads, wherein the data transducer exchanges information with the storage disk during data transfer operations, the pads are spaced from the leading and trailing edges and one another, extend below the air bearing surface and contact the storage disk when stiction occurs, the first pad is closer to the leading edge than to the trailing edge, and the second pad is closer to the trailing edge than to the leading edge; and
   a head suspension that secures the slider to the load beam and positions the slider near the storage disk, the head suspension maintaining the slider pitch at a pitch static attitude of less than zero degrees during the data transfer operations, wherein the stiction between the slider and the storage disk is substantially less than if the pitch static attitude was greater than zero degrees during the data transfer operations.

2. The disk drive of claim 1 wherein the head suspension maintains the slider at a pitch static attitude of between zero and approximately negative two degrees.

3. The disk drive of claim 1 wherein the head suspension maintains the slider at a pitch static attitude of less than approximately negative one degree.

4. The disk drive of claim 1 wherein the head suspension maintains the slider at a pitch static attitude of approximately negative two degrees.

5. The disk drive of claim 1 wherein the head suspension maintains the slider at a pitch static attitude of less than approximately negative two degrees.

6. The disk drive of claim 1 wherein the first pad is positioned between the leading edge and the second pad, and the second pad is positioned between the first pad and the trailing edge.

7. The disk drive of claim 1 including a ramp positioned near an outer diameter of the storage disk.

8. A transducer assembly for a disk drive, the disk drive including a storage disk and an actuator arm, the transducer assembly comprising:
   a slider including a data transducer, a leading edge, a trailing edge, an air bearing surface and first and second pads, wherein the data transducer exchanges information with the storage disk during data transfer operations, the pads are spaced from the leading and trailing edges and one another, extend below the air bearing surface and contact the storage disk when stiction occurs, the first pad is closer to the leading edge than to the trailing edge, and the second pad is closer to the trailing edge than to the leading edge;
   a load beam that attaches to the actuator arm; and
   a head suspension that secures the slider to the load beam and positions the slider near the storage disk, the head suspension maintaining the slider pitch at a pitch static attitude of less than zero degrees during the data transfer operations, wherein the stiction between the slider and the storage disk is substantially less than if the pitch static attitude was greater than zero degrees during the data transfer operations.

9. The transducer assembly of claim 8 wherein the head suspension maintains the slider at a pitch static attitude of between zero and approximately negative two degrees.

10. The transducer assembly of claim 8 wherein the head suspension maintains the slider at a pitch static attitude of less than approximately negative one degree.

11. The transducer assembly of claim 8 wherein the head suspension maintains the slider at a pitch static attitude of approximately negative two degrees.

12. A head stack assembly including an actuator arm and the transducer assembly of claim 8.

13. A disk drive including the transducer assembly of claim 8.

14. A method of making a disk drive, the method comprising the steps of:
   providing a storage disk;
   providing an actuator arm that moves relative to the storage disk;
   providing a slider including a data transducer, a leading edge, a trailing edge, an air bearing surface and first and second pads, wherein the data transducer exchanges information with the storage disk during data transfer operations, the pads are spaced from the leading and trailing edges and one another, extend below the air bearing surface and contact the storage disk when stiction occurs, the first pad is closer to the leading edge than to the trailing edge, and the second pad is closer to the trailing edge than to the leading edge;
   securing a load beam to the actuator arm; and
   securing the slider to the load beam with a head suspension, the head suspension maintaining the slider pitch at a pitch static attitude of less than zero degrees during the data transfer operations, wherein the stiction between the slider and the storage disk is substantially less than if the pitch static attitude was greater than zero degrees during the data transfer operations.

15. The method of claim 14 wherein the head suspension maintains the slider at a pitch static attitude of between zero and approximately negative two degrees.

16. The method of claim 14 wherein the head suspension maintains the slider at a pitch static attitude of less than approximately negative one degree.

17. The method of claim 14 wherein the head suspension maintains the slider at a pitch static attitude of approximately negative two degrees.

18. The method of claim 14 wherein the head suspension maintains the slider at a pitch static attitude of less than negative two degrees.

19. The method of claim 14 wherein the first pad is positioned between the leading edge and the second pad, and the second pad is positioned between the first pad and the trailing edge.

20. A disk drive, comprising:
   a storage disk; and
   a slider including a data transducer, a leading edge, a trailing edge, an air bearing surface and first and second pads, wherein the data transducer exchanges information with the storage disk during data transfer operations, the pads are spaced from the leading and trailing edges and one another, extend below the air bearing surface and contact the storage disk when stiction occurs, the first pad is closer to the leading edge than to the trailing edge, and the second pad is closer to the trailing edge than to the leading edge, the slider has a pitch static attitude of less than zero degrees during the data transfer operations, and the stiction between the slider and the storage disk is substantially less than if the pitch static attitude was zero degrees during the data transfer operations.

21. The disk drive of claim 20 wherein the pitch static attitude is between zero and negative two degrees.

22. The disk drive of claim 20 wherein the pitch static attitude is approximately negative two degrees.

23. The disk drive of claim 20 wherein the pitch static attitude is approximately negative two degrees.

24. The disk drive of claim 20 wherein the stiction is at least 50% less than if the pitch static attitude was zero degrees during the data transfer operations.

25. The disk drive of claim 20 wherein the stiction is at least 66% less than if the pitch static attitude was zero degrees during the data transfer operations.

26. The disk drive of claim 20 wherein the stiction is at least 75% less than if the pitch static attitude was zero degrees during the data transfer operations.

27. The disk drive of claim 20 wherein the stiction is at least 2 grams less than if the pitch static attitude was zero degrees during the data transfer operations.

28. The disk drive of claim 20 wherein the stiction is at least 3 grams less than if the pitch static attitude was zero degrees during the data transfer operations.

29. The disk drive of claim 20 wherein the stiction is at least 4 grams less than if the pitch static attitude was zero degrees during the data transfer operations.

30. The disk drive of claim 20 wherein the first pad is positioned between the leading edge and the second pad, and the second pad is positioned between the first pad and the trailing edge.

31. A disk drive, comprising:

a storage disk; and a slider including a data transducer, a leading edge, a trailing edge, an air bearing surface and first and second pads, wherein the data transducer exchanges information with the storage disk during data transfer operations, the pads are spaced from the leading and trailing edges and one another, extend below the air bearing surface and contact the storage disk when stiction occurs, the first pad is closer to the leading edge than to the trailing edge, the second pad is closer to the trailing edge than to the leading edge, the first pad is positioned between the leading edge and the second pad, the second pad is positioned between the first pad and the trailing edge, neither pad extends midway between the leading and trailing edges, the slider has a pitch static attitude of less than zero degrees during the data transfer operations, and the stiction between the slider and the storage disk is substantially less than if the pitch static attitude was zero degrees during the data transfer operations.

32. The disk drive of claim 31 wherein the pitch static attitude is between zero and negative two degrees.

33. The disk drive of claim 31 wherein the pitch static attitude is between negative one-half degree and negative two degrees.

34. The disk drive of claim 31 wherein the pitch static attitude is approximately negative two degrees.

35. The disk drive of claim 31 wherein the stiction is at least 50% less than if the pitch static attitude was zero degrees during the data transfer operations.

36. The disk drive of claim 31 wherein the stiction is at least 66% less than if the pitch static attitude was zero degrees during the data transfer operations.

37. The disk drive of claim 31 wherein the stiction is at least 75% less than if the pitch static attitude was zero degrees during the data transfer operations.

38. The disk drive of claim 31 wherein the stiction is at least 2 grams less than if the pitch static attitude was zero degrees during the data transfer operations.

39. The disk drive of claim 31 wherein the stiction is at least 3 grams less than if the pitch static attitude was zero degrees during the data transfer operations.

40. The disk drive of claim 31 wherein the stiction is at least 4 grams less than if the pitch static attitude was zero degrees during the data transfer operations.

* * * * *